C. A. SIPE.

APPARATUS FOR DEPOSITING COFFINS.

Reissued July 18. 1876.

No. 7,227.

Witnesses:
Robert C. Dunnington.
P. B. Ogden.

Inventor:
Conrad A. Sipe

N. PETERS, PHOTO-LITHOGRAPHER, WASHINGTON, D. C.

UNITED STATES PATENT OFFICE.

CONRAD ALBERT SIPE, OF WELLS TANNERY, PENNSYLVANIA.

IMPROVEMENT IN APPARATUS FOR DEPOSITING COFFINS.

Specification forming part of Letters Patent No. 157,550, dated December 8, 1874; reissue No. 7,227, dated July 18, 1876; application filed June 27, 1876.

*To all whom it may concern:*

Figure 1:
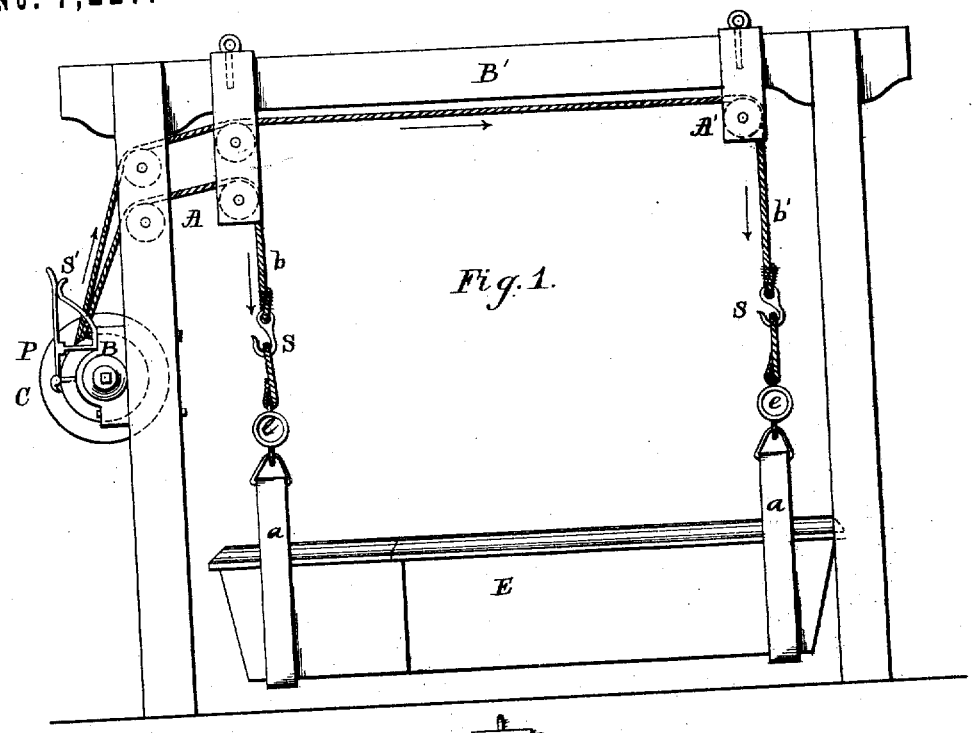
Figure 2:
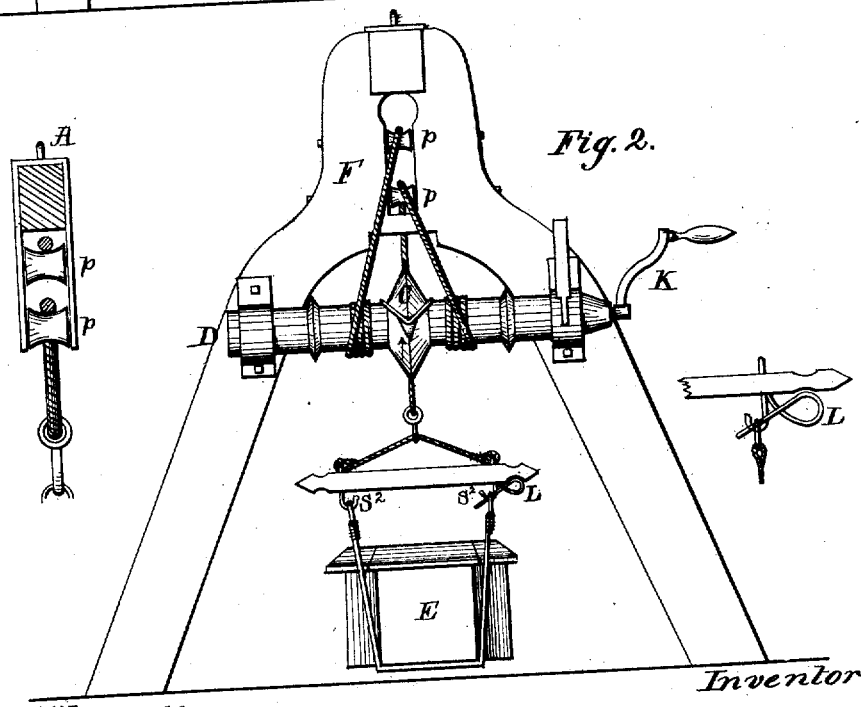

Be it known that I, CONRAD ALBERT SIPE, of Wells Tannery, in the county of Fulton and State of Pennsylvania, have invented a Machine for Lowering Coffins into Graves, called an "Adjustable Coffin-Depositor," of which the following is a specification:

The object of my invention is to easily and securely lower coffins into graves by a combination of a frame placed over them, having a drum, D, Figure 2, attached to the frame F, Fig. 2, governed by a crank, K, Fig. 2, and check-pin C, Fig. 1, the check-pin being kept in position by the spring $S^1$, Fig. 1, and the support P on the drum-bearings B, Fig. 1, together with the cords *b b'*, Fig. 1, which are adjustable on the flange *c* on the drum D, Fig. 2, and work through the stationary pulleys *p p* in the frame F, Fig. 2, and the adjustable pulleys A A', Fig. 1, on the bar B', Fig. 1, thereby lowering the coffin E, Fig. 1, as shown in the perspective views, Figs. 1 and 2, of the accompanying drawing.

After the frame, which may be taken apart at pleasure, is in position, the adjustable pulleys A A', Fig. 1, are placed in the position on the bar B', Fig. 1, required by the length of coffin to be deposited, and the cords *b b'*, Fig 1, are adjusted on the flange *c* on the drum D, Fig. 2, so as to cause the swinging bars *e e*, Fig. 1, which are secured to the cords *b b'* by the hooks S S, Fig. 1, to ride level. The straps *a a* are then passed beneath the coffin E, Fig. 1, and secured to the swinging bars *e e*, Fig. 1, by the hooks $S^2$ $S^2$, Fig. 2, when the coffin can be lowered with ease and safety by the crank K, Fig. 2, to its resting-place.

The spring L, Fig. 2, is a device for unloosing the ends of the straps *a a*, which pass beneath the coffin E, Fig. 1, after it has been lowered into the grave. It consists of a piece of tempered wire, coiled under one end of the swinging bars *e e*, Fig. 1, and fastened by the hooks $S^2$ $S^2$, Fig. 2, so as to ride level with their tops and beside them.

When the weight is on, the spring L, Fig. 2, is drawn down by the side of the hooks $S^2$ $S^2$, Fig. 2, and as soon as the coffin rests at the bottom of the grave it lifts the straps *a a*, Fig. 1, off the hooks $S^2$ $S^2$, Fig. 2, when they can easily be withdrawn, thus obviating all necessity of getting into the grave.

I claim as my invention—

The combination, in an adjustable coffin-depositor, of the adjustable pulley-blocks A A', portable frame F, lines *b b'*, adjustably attached to drum D, and spring L, all as set forth.

CONRAD ALBERT SIPE.

Witnesses:

ROBERT C. DUNNINGTON,

P. B. OGDEN.